UNITED STATES PATENT OFFICE.

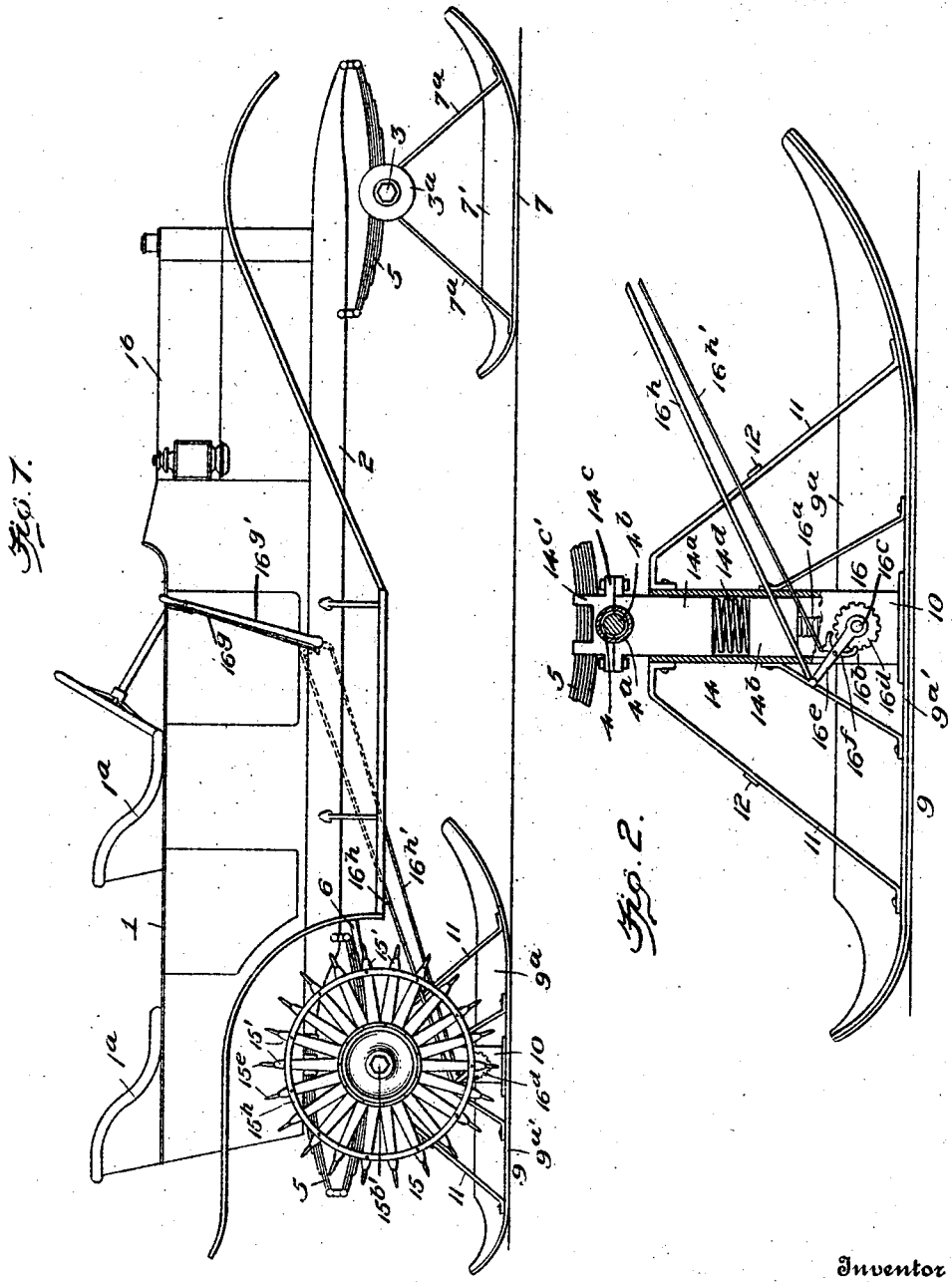

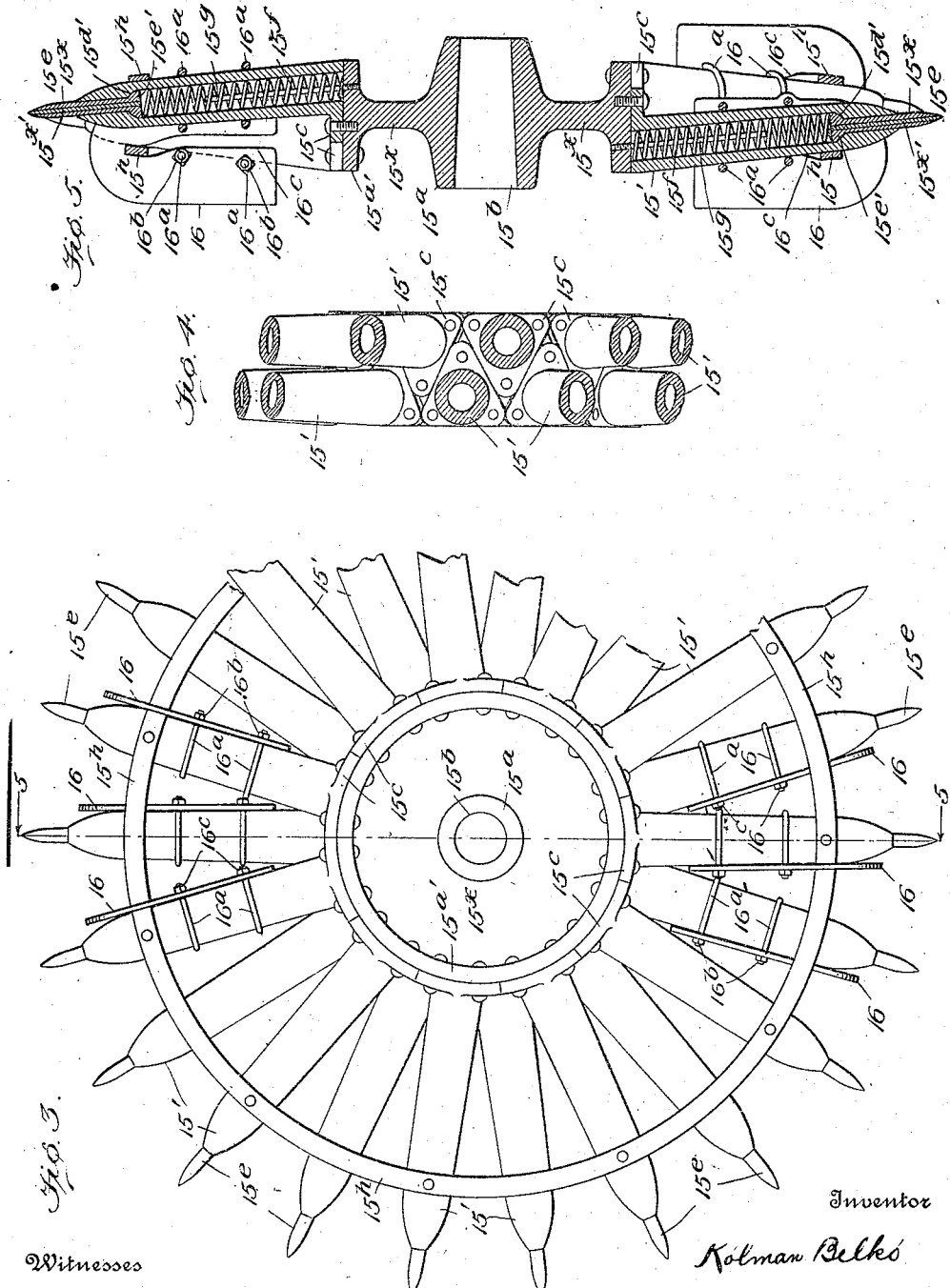

KÓLMÁN BELKÓ, OF PALOUSE, WASHINGTON.

AUTOSLED.

1,155,786.

Specification of Letters Patent.  Patented Oct. 5, 1915.

Application filed December 6, 1913. Serial No. 805,046.

*To all whom it may concern:*

Be it known that I, KÓLMÁN BELKÓ, a subject of the Emperor of Austria-Hungary, residing at Palouse, in the county of Whitman and State of Washington, have invented certain new and useful Improvements in and Relating to Autosleds, of which the following is a specification.

This invention relates to an auto sled adapted to travel over ice and snow covered surfaces, and particularly to the driving wheels of the sled.

One object of the invention is to provide an improved form of auto sled driving wheel adapted to have efficient tractive effect upon the snow.

Another object of the invention is to provide a driving wheel for an auto sled in which the parts are correlated to adapt themselves to any unevenness in the ground and obstructions without causing injury or damage to the wheel.

Another object of the invention is to provide a strong and rigid driving wheel capable of resisting strains without affecting the power of the wheel when in operation.

Another object of the invention consists in providing a driving wheel for an auto sled having spring operated members adapted to yield when contacting with obstructions in or on the surface of the snow or ice to avoid breakage and strains upon the driving wheels themselves or upon other parts of the vehicle.

Another object of the invention consists in providing the driving wheel with removable propeller blades adapted to increase the traction effect when the sled is passing through deep or loose snow.

With these and other objects in view, the invention consists in the parts and combination of parts hereinafter described and claimed in the appended claims.

Referring to the drawings, wherein I have illustrated one embodiment of my invention—Figure 1 is a side elevation of an auto sled embodying my invention. Fig. 2 is a fragmentary sectional view showing one of the rear runners in elevation and the casing for one of the elevating devices, the casing being broken away. Fig. 3 is a side elevation of one of the driving wheels, a few of the spokes being shown as provided with propeller blades. Fig. 4 is a fragmentary sectional view of one of the driving wheels. Fig. 5 is a transverse sectional view through one of the driving wheels on the line 5—5 of Fig. 3.

In the drawings, 1 indicates the body of an automobile having one or more seats $1^a$ and a hood $1^b$ adapted to inclose a suitable engine (not shown). The body and hood are mounted on a suitable frame 2.

3, 4, indicate the front and rear axles, respectively, for the automobile and adapted to receive a set of wheels (not shown) in a well known manner.

5 indicates the springs interposed between the axles 3, 4, and the frame 2.

6 indicates the drive shaft through which the power from the engine is communicated to the rear axle 4 to propel the automobile or auto sled, as the case may be.

The rear axle 4 preferably comprises a casing $4^a$ through which the live axle section $4^b$ extends.

It will be understood that the parts so far described may be of any standard or preferred form of construction. As these parts, in themselves, form no part of my invention, further description thereof will not be necessary.

7, indicate the front runners for the auto sled or vehicle, only one runner being shown. The runner 7 is preferably of inverted T-shape, its base or snow-engaging member being relatively wide for a purpose to be hereinafter set forth. The web 7' of the runner 7 serves to strengthen it from end to end.

$7^a$ indicates a pair of upwardly inclined standards fixed at their lower ends in a well known manner to the runner 7. At their upper ends, the standards $7^a$ are connected together by strap members (not shown) which are formed to receive between them the spindles of the front axle 3. Each strap member is detachable to permit the attachment and detachment of the runner 7 to the axle 3. The strap members are preferably of a width to fit between the inner collar of the axle spindle and the cap $3^a$, whereby the latter in coöperation with the collar, may prevent movement of the adjacent runner longitudinally of the axle 3.

9 indicates the rear runners, one only being shown. The runner 9 is preferably of inverted T-shape and somewhat longer than the front runner 7.

10 indicates an upright hollow guide member or casing supported on the runner 9. The member 10 is preferably cut away at 10ª to receive the web 9ª of the adjacent runner in order that its lower end may rest upon the base portion 9ª' of the runner and midway between its opposite longitudinal edges. The rear runners 9 are preferably arranged directly below the rear springs for the vehicle.

11 indicates a pair of upwardly inclined, parallel arranged standards which are fixed at their lower ends to the base 9ª' of the adjacent runner 9. At their upper ends the standards 11 are secured to the cylinder 10 and serve to maintain it in upright position.

12 indicates cross rods suitably fixed at their opposite ends to the standards 11. Braces extending diagonally and at right angles to each other, and fixed at their opposite ends to the runners 9 may also be provided.

The standards 11, rods 12 and braces serve to maintain the runners 9 parallel to each other and the members 10 in vertical position, thus overcoming in an efficient manner all strains imparted to the runners due to uneven surfaces over which they pass.

14 indicates as an entirety adjustable supporting and elevating means for the vehicle, preferably interposed between the cases 10 and rear axle 4. Of these means, 14ª, 14ᵇ, indicate a pair of slides superposed relatively to each other and movable vertically in each case 10. The slides 14ª, 14ᵇ, are of a size to slidably fit within, and be guided by the inner walls of the adjacent case 10. The upper end of the slide 14ª is grooved to receive the rear axle casing 4ª to which it is secured by a similarly grooved member 14ᶜ, whereby said axle 4 may be elevated or lowered, as desired. The member 14ᶜ may be provided with suitable loops 14ᶜ' adapted to engage the adjacent spring 5, thus serving as a single means for securing the spring, axle and slide together.

14ᵈ indicates a yieldable device, preferably a coiled spring, interposed between the slides 14ª, 14ᵇ, and permitting movement of the slides relative to each other. The spring 14ᵈ absorbs shocks and jars, prevents the parts constituting the elevating means from rattling and permits the runners 9 to yield, relative to the vehicle frame, when passing over obstructions and uneven surfaces without affecting the traction of the wheels 15 (which are hereinafter described) for driving the vehicle forwardly and rearwardly.

16 indicates a lifting jack for moving the slides 14ª, 14ᵇ and spring 14ᵈ upwardly. The lifting jack may be of any standard or preferred form of construction. The form of jack herein illustrated comprises an elevating member 16ª, operated in one direction or the other by a pawl and ratchet mechanism 16ᵇ. The mechanism 16ᵇ consists of a shaft 16ᶜ having a ratchet wheel 16ᵈ fixed thereto, a lever 16ᵉ loosely pivoted on the shaft 16ᶜ and carrying a double pawl 16ᶠ, a pair of levers 16ᵍ, 16ᵍ', and two lines of connections 16ʰ, 16ʰ', leading from the levers 16ᵍ, 16ᵍ' to the lever 16ᵉ and pawl 16ᶠ, respectively. The levers 16ᵍ, 16ᵍ' are arranged adjacent to the driver's seat 1ª in the vehicle so that the driver can manipulate each lever when desired. The levers 16ᵍ, 16ᵍ', are mounted in any suitable manner upon the frame of the vehicle. The lever 16ᵍ, which is connected to the lever 16ᵉ, is reciprocable and transmits intermittent movement in one direction to the ratchet 16ᵈ, according to the position of the pawl 16ᶠ. When it is desired to rotate the ratchet 16ᵈ in the opposite direction, the lever 16ᵍ' is manipulated and, acting through the line of connection 16ʰ', shifts the pawl 16ᶠ on its pivot so that its other nose will engage the ratchet 16ᵈ. If now the lever 16ᵍ is reciprocated, the ratchet wheel 16ᵈ will be intermittently operated in the other direction. The operation of the ratchet wheel 16ᵈ in one direction will elevate the slide 14ᵇ, which in turn, acting on the spring 14ᶜ, will elevate the slide 14ª, thus raising the rear axle 4 and the parts connected therewith. When it is desired to lower the rear axle 4 and the parts connected therewith, the ratchet 16ᵈ is rotated in the opposite direction, thus permitting the axle 4 to move downwardly under the influence of gravity.

The driving wheels 15 are preferably arranged in line with the front runners in order that the snow lying in the path or track of and engaged by the driving wheels may be packed or compressed by the weight of the vehicle. This operation of the front runners forms a track of hard snow to be engaged by the driving wheels 15 and thus increases the traction effect between the wheels and the snow. The front runners 7, as already set forth, are relatively wide, that is, they are wider than the spokes 15' of the driving wheels 15 in order that a compressed snow track of sufficient width and greater than the width of the driving wheels may be formed.

Referring to the driving wheel, 15ª indicates a hub having a web 15ˣ, an annular member 15ª' surrounding the web 15ˣ and projecting laterally from opposite sides thereof, and a bearing 15ᵇ of suitable construction to fit the spindle of the rear axle 4 when the rear road wheel has been removed. The hub 15ª is preferably of such construction that the same nut, indicated at 15ᵇ', for the road wheel will hold the driving wheel 15 in position on the axle. The spokes 15' comprise tubular members having flanges 15ᶜ at their inner ends, by means of which they may be detachably secured to the annular member 15ᵃ′. The flanges 15ᶜ are preferably of triangular shape (see Fig. 4). This construction permits the spokes to be arranged closely together with the side edges of the flanges in engagement with each other, whereby they will co-act to prevent twisting of the spokes on the annular member 15ᵃ′. As a result of this arrangement, the inner ends of adjoining spokes are disposed on opposite sides of a longitudinal plane passing centrally through the wheel; however, as each spoke member 15′ is inclined laterally, it will be seen that the free ends of the spoke members all terminate in the same vertical plane, which is preferably the central longitudinal plane of the wheel.

15ᵉ indicates a member slidably mounted in and arranged to project outwardly from the free end of each spoke 15′. As will be understood from the drawings, the opening through the spoke 15′, near the outer end thereof, is contracted to form a shoulder 15ᵈ′, which is adapted to be engaged by the head 15ᵉ′ of the slidable member 15ᵉ to limit the movement thereof in the outward direction. The slidable member 15ᵉ is preferably formed of two parts, an outer part 15ˣ of soft iron and an inner part or core 15ˣ′ of hard material, in order that the free or contact end of the member may remain sharp or pointed at all times, as will be well understood.

15ᶠ indicates a thrust spring mounted within each spoke member 15′ and normally engaging at its opposite ends the annular member 15ᵃ′ and the head 15ᵉ′ of the slidable member 15ᵉ. This spring 15ᶠ operates to push or thrust the slidable member 15ᵉ outwardly and radially, but permits said member to yield or contract in opposition to the tension thereof when the slidable member comes into contact with an obstruction or elevation in the snow through or over which the driving wheel 15 is passing. The inner end of each spring may be secured to the spoke member 15′ or to the annular member 15ᵃ′.

15ᵍ indicates a guide bar extending longitudinally of and within each spoke member 15′ and disposed centrally of the adjacent spring 15ᶠ. It is preferably detachably secured, as by means of screw threads fitting a screw threaded opening in the annular member 15ᵃ′. The bar 15ᵍ operates to guide the spring 15ᶠ during compression and expansion; its free end also operates as a stop to limit the inward movement of the adjacent slidable member 15ᵉ. The screw threaded connection between the inner end of each bar 15ᵍ and the annular member 15ᵃ′ permits the bar 15ᵍ to be adjusted endwise or longitudinally of the adjacent spoke. This adjustability of the bar 15ᵍ is advantageous since it may be moved outwardly from time to time, whereby its free end may be positioned to operate at all times as a stop for the slidable member 15ᵉ as the latter wears away and becomes shorter.

15ʰ indicates a pair of bands disposed upon opposite sides and near the free ends of the spokes 15′. The bands 15ʰ are preferably formed of metal and may be secured to the spokes 15′ in any suitable manner. They operate to connect the spokes 15′ together, thus maintaining them in fixed relation to each other and strengthening the wheel structure throughout.

16 indicates a propeller blade preferably detachably secured to each spoke 15′ and extending laterally therefrom. Each blade 16 is preferably fixed to the adjacent spoke 15′ by a pair of U-shaped members 16ᵃ, the opposite ends of which are screw threaded to receive nuts 16ᵇ. At 16ᶜ each blade 16 is formed with a slot to permit it to fit over one of the bands 15ʰ. The purpose of the blades is to form a relatively wide surface to engage the snow, whereby the traction between the driving wheels and the snow may be effective. The blades 16 are particularly adapted for use when the snow is loose and not thickly compressed, and deep. I prefer to so arrange the blades 16 that the blade on one spoke 15′ will project laterally to one side of the wheel and the blade on the adjoining spoke 15′ will project laterally to the other side of the wheel. As a result of this construction, each blade 16 acts upon the snow to increase the traction between the driving wheel and the snow; in other words, the blade 16 carried by that spoke 15′ which at any particular instant is transmitting forward movement to the vehicle, engages the snow in its immediate vicinity on one side only of the wheel and leaves the snow on the other side of the wheel substantially untouched for engagement by the blade 16 of the succeeding spoke 15′. It will thus be seen that each blade 16 engages with snow which has not been displaced by the passage therethrough of the previous spoke 15′. It will also be seen that the arrangement permits the spacing of correspondingly arranged blades sufficiently far apart so that after one blade has acted upon the snow the wheel will traverse a distance therethrough far enough to permit the next correspondingly arranged blade to act upon or engage with a new portion or body of snow.

It will be noted that my invention is not limited to the embodiment thereof which I have chosen to illustrate and described herein, it being obvious that changes therein can be made without departing from the spirit of the invention defined in the appended claims.

In the form of the invention herein illustrated, the shafts or rods, which form the pivots for the levers 16ᵍ, 16ᵍ′, extend transversely across the vehicle frame 2 for connection with the lines of connection 16ʰ, 16ʰ' on the remote side of the auto sled as viewed in Fig. 1, in order that the elevating means 14 for both rear driving wheels may be operated simultaneously. If desired, two pairs of levers 16ᵍ, 16ᵍ' may be provided, each pair being connected through separate lines of connection 16ʰ, 16ʰ' with the adjacent elevating means, 14, so that either of said elevating means may be operated and controlled independently of the other elevating means.

What I claim is:

1. In a driving wheel for an auto sled, the combination of a hub having an annular member, a series of hollow spokes detachably connected to said annular member, a slide member slidably mounted in each spoke and normally projecting beyond the free end thereof, and a compression spring arranged within each of said spokes for maintaining the adjacent slide member in projected position, the said spring permitting the slide member to retract when engaging an obstruction.

2. In a driving wheel for an auto sled, the combination of a hub having an annular member, a series of hollow spokes detachably connected to said member and each having a contracted axial opening at its free end to form a shoulder, a slide member slidably mounted in the contracted opening of each spoke and normally projecting in axial line with and beyond the free end of the spoke, the said slide member having a head arranged to engage the shoulder to limit its outward movement, and a compression spring arranged within each of said spokes for maintaining the adjacent slide member in projected position, the said spring permitting the slide member to retract when engaging an obstruction.

3. In a driving wheel for an auto sled, the combination of a hub having an annular member, a series of hollow spokes detachably connected to said member and each having a contracted axial opening at its free end to form a shoulder, a slide member slidably mounted in the contracted opening formed in each spoke and normally projecting in axial line with and beyond the free end of the spoke, the said slide member having a head arranged to engage the shoulder to limit its outward movement, and a compression spring arranged within each of said spokes and engaging the annular member and the head of the slide member at its opposite ends, whereby said slide member is yieldingly maintained in projected position.

4. In a driving wheel for an auto sled, the combination of a hub having an annular member, a series of hollow spokes connected to said member, a slide member slidably mounted in each spoke and normally projecting beyond the free end thereof, a compression spring mounted in each of said spokes and arranged to engage the adjacent slide member for maintaining it in projected position, and a rod centrally disposed in and extending longitudinally of each spoke for guiding the spring during compression.

5. In a driving wheel for an auto sled, the combination of a hub having an annular member, a series of hollow spokes connected to said member, a slide member slidably mounted in each spoke and normally projecting beyond the free end thereof, a compression spring mounted in each of said spokes and arranged to engage the adjacent slide member for maintaining it in projected position, and a rod centrally disposed in and extending longitudinally of each spoke for guiding the adjacent spring during compression, the free end of the rod serving as a stop to limit the retraction of the adjacent slide member.

6. In a driving wheel for an auto sled, the combination of a hub having an annular member, a series of hollow spokes connected to said annular member, a slide member mounted in each spoke to slide axially thereof and normally projecting beyond its free end, a compression spring arranged within each spoke and arranged to engage the adjacent slide member for maintaining it in projected position, and a rod within each spoke and arranged in line with its axis and the axis of said slide member the free end of the rod serving as a stop to limit the retraction of the adjacent slide member when engaging an obstruction.

7. In a driving wheel for an auto sled, the combination of a hub having an annular member, a series of hollow spokes connected at their inner ends to said annular member, a yieldable device slidably mounted in the free end of each spoke and normally projecting beyond the free end thereof, a compression spring mounted in each of said spokes and in engagement with the adjacent slidable device for maintaining it in normal position, and a rod arranged within each spoke, one end of the rod being adjustably connected to the annular member and its opposite end serving as a stop to limit the retraction of said slidable device.

8. In a driving wheel for an auto sled, the combination of a hub having an annular member, a series of spokes each provided with a triangular flange, the said spokes being arranged alternately upon opposite sides of the central longitudinal plane of the hub to permit the flanges of adjoining spokes to be arranged edge to edge, and means for detachably securing the flanges to said annular member.

9. In a driving wheel for an auto sled, the combination of a hub having an annular member, a series of spokes each provided with a triangular flange, the said spokes being arranged alternately upon opposite sides of the central longitudinal plane of the hub to permit the flanges of adjoining spokes to be arranged edge to edge, the said spokes being inclined toward each other, whereby they terminate at their free ends in the central longitudinal plane of the hub.

10. In a driving wheel for an auto sled, the combination of a hub, a series of hollow spokes connected thereto, a device slidably mounted in and normally projecting beyond the free end of each spoke, the said device comprising a core of hard material and a sleeve of relatively soft material, and means for yieldingly maintaining the said device in normal position.

11. In a driving wheel for an auto sled, the combination of a hub, a series of spokes secured thereto, and propeller blades carried by and extending longitudinally of said spokes and projecting therefrom at right angles to the plane of the wheel, the blades on adjoining spokes projecting in opposite directions.

12. In a driving wheel for an auto sled, the combination of a hub, a series of spokes secured thereto, the said spokes being alternately disposed upon opposite sides of the central longitudinal plane of the hub and inclined relative thereto, whereby the free ends of the spokes terminate in said plane, and laterally projecting propeller blades carried by said spokes, the blade on one spoke projecting opposite to the blade on the adjoining spoke.

KÓLMÁN BELKÓ.

Witnesses:
J. C. ZESIGER,
GEO. N. LAMPHERE, Jr.